Patented July 7, 1942

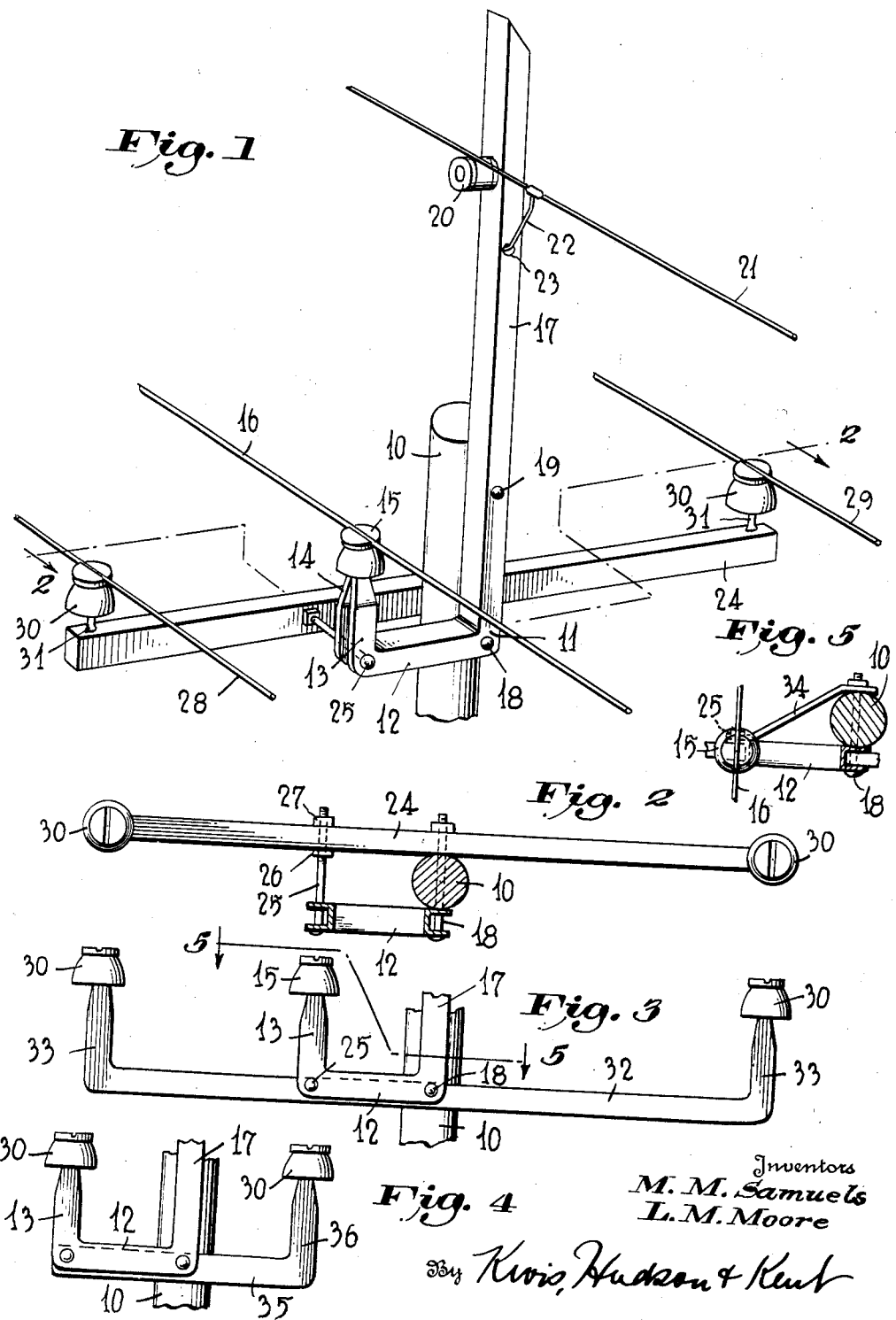

2,288,746

UNITED STATES PATENT OFFICE 2,288,746

TRANSMISSION LINE SUPPORT

Maurice M. Samuels and Leverett M. Moore, Washington, D. C., assignors to The Standard Transformer Company, Warren, Ohio, a corporation of Ohio Original application February 16, 1940, Serial No. 319,368, now Patent No. 2,264,773, dated December 2, 1941. Divided and this application October 21, 1941, Serial No. 415,982

6 Claims. (Cl. 248—220.5)

This invention, of which the following specification is a detailed description, relates to supporting means for electrical transmission or distribution lines. In many conditions of service it is a matter of considerable importance to provide adequate safe electrical distribution lines with minimum expense for material and labor of installation. It is also important to have the equipment of a simple, rugged type which will not only be serviceable but which may be installed and maintained with the minimum of skilled labor.

We have invented a supporting bracket which meets the requirements of transmission and distribution systems as outlined above. Our invention also comprises combinations of the bracket unit by which varying types of electrical service may be provided and maintained by the interchangeable assembly of such bracket units.

One of the objects of our invention is the provision of a bracket unit formed of one integral section of angle iron or channel bar which will be adaptable for several different types of installation.

The bracket unit such as we have devised provides for the satisfactory support not only of one or more line wires but also a neutral or ground wire. It also serves as a lightning rod. Such a bracket element can be mounted upon a support with a minimum number of attaching means and will be ready for service without further preparation.

One object of our invention is to so mount the improved bracket element so that it will be adequately braced against stresses and loads to which it may be subjected in service. Incidental to this purpose, the bracket element is suitably braced on its support to withstand any tendency toward rotation or similar deflection from the desired position.

A still further object of our invention is to provide supports in the form of brackets suitable for use with the standard or conventional crossarms or in the alternative, on new construction projects, to take the place of the customary crossarms and yet provide the usual number and arrangement of line supports or pin insulators.

It will be seen from the description of the invention that the devices provide suitable supports for whatever type of electric circuit it may be found most desirable to install.

As illustrating the preferred form of our invention we have shown various arrangements thereof on the accompanying drawing in which Fig. 1 is a perspective view of the improved support adapted for a three-phase four-wire circuit including a neutral or ground wire;

Fig. 2 is a horizontal section of the same taken on the line 2—2 of Fig. 1;

Fig. 3 is a side elevation of a modification also adapted for three-phase four-wire star circuits;

Fig. 4 is a side elevation of a modified form for two conducting wires of different phases and a neutral or ground wire and;

Fig. 5 is a horizontal section on the line 5—5 of Fig. 3.

It is intended that our improved support shall be adapted for mounting on a suitable pole or support 10.

The bracket 11 is itself formed integrally from a single piece of rolled sheet metal which may be given a cross-section either of an angle or of a channel. Either of these cross-sections will supply sufficient rigidity to carry the estimated vertical load, wind load and unbalanced pull in the direction of the wiring itself.

The mid-portion 12 is arranged at right angles to a short end section 13. This section has flange extensions tapered at its upper end to form the threaded pin 14 upon which an insulator 15 may be attached in the usual manner. The insulator 15 serves as a support for the electric wire or conductor 16. This section 13 should be of sufficient length that birds perching on the mid-portion 12 will not be able to come in contact with the charged wire 16.

At the opposite end of the mid-portion 12 there is a long end section 17 extending in the same plane with the mid-portion 12 and the insulator support or short end section 13. The sections 13 and 17 are not only parallel but extend in the same direction from the mid-portion 12. The end section 17 is sufficiently long to project the desired distance above the end of the pole 10 thus serving as a lightning rod and also to carry the grounded conductor.

The bracket is mounted upon the pole 10 by means of two screw-threaded bolts or rods. The lower one 18 passes through both flanges of the channel shaped bracket and diametrically through the pole 10. It is located at the juncture between the mid-portion and the long end section. The second fastening means also in the form of a screw-threaded bolt or rod 19 passes transversely through the long end section at an intermediate point and clamps the latter to the pole 10.

The upper end of the section 17 has a knob, spool or any suitable fitting 20 which serves as a support for a neutral wire 21. A ground wire 22 runs from the neutral wire 21 through an aperture 23 in one flange of the end section and thence between the flanges of the end section and finally along the pole to the ground. Where the fitting 20 is an electrical conductor, the bracket itself serves as a conductor of the abnormal current surges received from the wire 21 and in such cases the ground wire may have its upper end connected at some suitable point along the bracket, for example at the bolt 18.

The drawing shows the bracket used in conjunction with various forms of cross members. Thus in Figs. 1 and 2 it has been shown with a conventional wooden cross-arm 24. When so arranged the bracket takes the place of the angular braces usually found necessary to hold the cross-arm horizontal. In this arrangement bolt 18 passes through not only the juncture of the parts 12 and 17 of the bracket 11 but also the pole 10 and the cross-arm 24. This is clearly shown in Fig. 2.

In like manner a bolt 25 passes transversely through the bracket at the angle of the mid-portion 12 with the insulator support 13 and is extended for a length comparable with the bolt 18. The bolt 25 has a long screw-thread at its free end and two nuts 26 and 27 between which the cross-arm 24 is clamped.

As shown in Fig. 2 this provides a rectangular arrangement between the bracket, the cross-arm, the pole and the bolt 25. Thus the cross-arm and the bracket are mutually braced against lateral twisting.

It is also clearly apparent that the angular arrangement between parts 12 and 17 of the bracket forms a brace for the cross-arm 24 eliminating the necessity for any other means to prevent the cross-arm from dropping into inclined position, that is, out of the horizontal.

The circuit for which this arrangement is primarily adapted comprises three conducting wires and an additional grounded neutral wire 21. In addition to the conducting wire 16 mounted on the insulator 15 and the insulator supporting pin 14, the circuit includes conducting wires 28 and 29 mounted on insulators 30, 30 on the pins 31 on opposite ends of the cross-arm.

In new construction or where it is not desired to rely upon the usual timber cross-arms, it is found that an angle iron or channel bar of steel can be used with equal serviceability. In Fig. 3 such an arrangement has been illustrated. It comprises a metal cross-arm 32 with integral ends 33, 33 forming pin supports for the insulators 30, 30 at the same level with the insulator 15 on the bracket portion 13. In this instance the cross-arm is of channel cross-section and fits within the flanges of the mid-portion 12 of the bracket. It is held in position by bolts 18 and 25 and the section 17 is held by bolt 19 in the manner shown in Fig. 1. Where this arrangement is followed it will be evident that a diagonal brace 34 connects the bolt 25 with the end of the bolt 18 projecting from the opposite side of pole 10 as illustrated in Fig. 5.

The same circuit arrangements are possible with the metal cross-arm as have already been described with the standard timber cross-arm.

As an alternative for the arrangement shown in Fig. 3 and where only two conductors are needed, the cross-arm may have only one insulator support. In such a case as shown in Fig. 4 the cross-arm 35 will extend horizontally in each direction from the end section 17 for a distance equal only to the length of the mid-portion 12 of the bracket. In one direction the cross-arm fits within the flanges of the mid-portion 12. The oppositely extending portion, also of equal length carries the pin supporting end 36. This arrangement of course is suitable for supporting two conductors with a grounded neutral wire on the long end section 17 of the bracket.

The above description shows the manner in which our invention can be embodied in several forms and adapted for maintaining different types of electric transmissions for distributing systems. The forms of the invention here claimed were disclosed in our application for patent on an insulator supporting bracket for electrical transmission lines filed February 16, 1940, Serial No. 319,368 of which this application is a division, said application having eventuated in Patent No. 2,264,773, granted December 2, 1941.

It will be evident that the description and illustrations are mainly illustrative and numerous changes in materials, proportions and arrangements are possible within the scope of the appended claims.

What we claim is:

1. In combination, a bracket comprising an integral rolled sheet metal bar having a mid-portion, an insulator support at a right angle to the mid-portion, a long end section in a common plane with the mid-portion and said insulator support and extending parallel to the latter and in the same direction, a cross-arm, fastening means for clamping the cross-arm and bracket to a support, second fastening means spaced from the first named means for rigidly connecting the cross-arm and bracket, and means separately fastening the long end section to the support.

2. In combination, a bracket comprising an integral rolled metal channel bar having a mid-portion, an insulator support at a right angle to the mid-portion, a long end section in a common plane with the mid-portion and insulator support and extending in the same direction and parallel to the latter, a cross-arm contiguous to the mid-portion of said channel bar, an integral upwardly extending insulator support at the end of the cross-arm, spaced means for fastening said channel bar and cross-arm together, one of said means also clamping the channel bar to a support, and separate means for clamping the long end section to the support.

3. In combination, a bracket comprising an integral rolled metal channel bar having a mid-portion, an insulator support at a right angle to the mid-portion, a long end section in a common plane with the mid-portion and insulator support and extending parallel to the latter and in the same direction, a cross-arm in the mid-portion of said channel bar, an integral upwardly extending insulator support at one end of the cross-arm, spaced means for fastening said channel bar and cross-arm together, one of said means also clamping the channel bar to a support, and separate means for clamping the long end section to the support.

4. In combination, a bracket comprising an integral rolled metal channel bar having a mid-portion, an insulator support at a right angle to the mid-portion, a long end section in a common plane with the mid-portion and insulator support and extending parallel to the latter and in the same direction, a cross-arm in the mid-portion of said channel bar, integral upwardly extending insulator supports at the opposite ends of said cross-arm, spaced means for fastening said channel bar and cross-arm together, one of said means also clamping the channel bar to a support, and separate means for clamping the long end section to the support.

5. In combination, a bracket comprising an integral rolled metal channel bar having a mid-portion, an insulator support at a right angle to the mid-portion, a long end section in a common plane with the mid-portion and insulator support and extending parallel to the latter and in the same direction, a cross-arm in the mid-portion of said channel bar, integral upwardly extending insulator supports at the opposite ends of said cross-arm beyond the first mentioned insulator support and on the same level, means for fastening said channel bar and cross-bar together, and means for clamping said channel bar to a support.

6. In combination, a bracket comprising an integral rolled metal channel bar having a mid-portion, an insulator support at a right angle to the mid-portion, a long end section in a common plane with the mid-portion and insulator support and extending in the same direction and parallel to the latter, a cross-arm, fastening means for clamping the cross-arm and bracket on opposite sides of a support, means spaced from the first named means for rigidly holding the cross-arm and bracket in parallel relation, and means separately fastening the long end section to the support.

MAURICE M. SAMUELS.
LEVERETT M. MOORE.